United States Patent
Flynn et al.

(10) Patent No.: US 8,333,408 B2
(45) Date of Patent: Dec. 18, 2012

(54) LABEL ASSEMBLY FOR APPLYING A LABEL TO ELECTRONIC DEVICES

(75) Inventors: Timothy J. Flynn, Key Largo, FL (US); Geoffrey T. Brossard, Crystal Lake, IL (US); Kaitlyn Benoit, Aurora, IL (US)

(73) Assignee: Continental Datalabel, Inc., Elgin, IL (US)

( * ) Notice: Subject to any disclaimer, the term of this patent is extended or adjusted under 35 U.S.C. 154(b) by 62 days.

(21) Appl. No.: 12/818,638

(22) Filed: Jun. 18, 2010

(65) Prior Publication Data
US 2011/0309608 A1   Dec. 22, 2011

(51) Int. Cl.
*B42D 15/00*  (2006.01)
*G09C 3/00*   (2006.01)

(52) U.S. Cl. ............... 283/81; 283/61; 283/62; 283/67; 283/70; 283/74; 283/94; 283/98; 283/99; 283/101; 283/105

(58) Field of Classification Search ............ 283/61, 283/62, 67, 70, 74, 81, 94, 98, 99, 101, 105
See application file for complete search history.

(56) References Cited

U.S. PATENT DOCUMENTS

| | | | |
|---|---|---|---|
| 4,454,180 A | 6/1984 | La Mers | |
| 5,705,245 A | 1/1998 | Loemker et al. | |
| 6,073,377 A | 6/2000 | Mehta | |
| 6,375,065 B1 | 4/2002 | Flynn et al. | |
| 6,479,118 B1 | 11/2002 | Atkinson | |
| 6,776,866 B2 | 8/2004 | Flynn et al. | |
| 7,140,136 B2 | 11/2006 | Flynn et al. | |
| 7,398,999 B2 * | 7/2008 | Kaufman | 283/81 |
| 7,726,696 B2 | 6/2010 | Flynn et al. | |
| 7,874,594 B2 | 1/2011 | Flynn et al. | |
| 7,959,187 B2 | 6/2011 | Flynn et al. | |
| 7,963,564 B2 | 6/2011 | Flynn et al. | |
| 2001/0025689 A1 | 10/2001 | Barnet | |
| 2004/0137198 A1 | 7/2004 | Flynn et al. | |
| 2004/0137199 A1 | 7/2004 | Flynn et al. | |
| 2005/0178506 A1 | 8/2005 | Flynn et al. | |

(Continued)

FOREIGN PATENT DOCUMENTS

JP   2006-145918 A   6/2006

(Continued)

OTHER PUBLICATIONS

Co-pending U.S. Appl. No. 13/011,022, T.J. Flynn, "Label Assembly Having Registration Structures for Applying a Label to an Object," filed Jan. 21, 2011.

*Primary Examiner* — Dana Ross
*Assistant Examiner* — Justin V Lewis
(74) *Attorney, Agent, or Firm* — Pauley Petersen & Erickson

(57) ABSTRACT

A label assembly that includes a face sheet with a label shape defined by one or more tearable lines of separation, a back sheet adjacent to the face sheet, and an adhesive material disposed between the face sheet and the back sheet. The back sheet includes at least one removable panel disposed over at least a portion of the label shape and including a grasp tab extending from the first removable panel into contact with a remaining portion of the back sheet or an edge of the label assembly. The label assembly also includes a registration structure for use in aligning and adhering the label shape to the object to be labeled.

19 Claims, 5 Drawing Sheets

U.S. PATENT DOCUMENTS

| | | |
|---|---|---|
| 2006/0010742 A1 | 1/2006 | Steininger |
| 2006/0011076 A1 | 1/2006 | Durban |
| 2006/0032764 A1 | 2/2006 | Swenson |
| 2006/0037507 A1 | 2/2006 | Trigg et al. |
| 2008/0093841 A1* | 4/2008 | Flynn et al. .............. 283/81 |
| 2009/0186181 A1 | 7/2009 | Mase |
| 2009/0295140 A1 | 12/2009 | Flynn et al. |
| 2009/0295143 A1 | 12/2009 | Flynn et al. |
| 2010/0102544 A1 | 4/2010 | Flynn |
| 2010/0102545 A1 | 4/2010 | Flynn |
| 2010/0237604 A1 | 9/2010 | Flynn et al. |

FOREIGN PATENT DOCUMENTS

| | | |
|---|---|---|
| KR | 10-2005-0093046 A | 9/2005 |

* cited by examiner

LABEL ASSEMBLY FOR APPLYING A LABEL TO ELECTRONIC DEVICES

FIELD OF THE INVENTION

This invention is directed to a label assembly for application of a label to an object, and more particularly relatively large handheld electronic devices such as, without limitation, book readers, the APPLE IPAD® electronic devices, or tablet or laptop computers. The invention is also directed to a printable sheet of such labels, and a method for printing and/or applying the printed labels, such as by a consumer.

SUMMARY OF THE INVENTION

The label assembly of this invention allows for aligning and applying a label to an object. The label assembly of this invention is particularly useful in applying a label that has a relatively large surface, such as for decorating or personalizing consumer electronics including book readers and handheld or laptop computers. The label assembly and method of this invention provide desired alignment of the label on the object to be labeled without the need for a separate label application apparatus.

The invention includes, at least in part, a label assembly including a label for an object. The label assembly includes a face sheet with at least one label shape defined by at least one tearable line of separation, a back sheet adjacent to the face sheet, and an adhesive material disposed between the face sheet and the back sheet. The back sheet includes a removable panel disposed over at least a portion of the label shape and a grasp tab extending from the first removable panel into contact with a remaining portion of the back sheet or an edge of the label assembly.

Particular embodiments of this invention further include a second removable panel disposed over a second portion of the label shape. The second removable panel is adjacent to and separated from the first removable panel by a panel separation line. A grasp tab extends from each of the first removable panel and the second removable panel. A first grasp tab extends from the first removable panel into contact with a remaining portion of the back sheet or an edge of the label assembly. A second grasp tab extends from the second removable panel toward the first removable panel.

The second grasp tab can facilitate removal of the second removable panel after adhering the first label portion to the object. Positioning the grasp tab at or toward the middle of the interior side edge of the removable panel, and adhering the second label portion as the second removable panel is laterally removed using the grasp tab, facilitates a proper alignment and/or reduces or eliminates air bubbles between the applied label and the object.

The label assembly of this invention desirably includes a registration structure for assisting in properly aligning the label shape to the object. The registration structure can be formed as a raisable registration tab formed in the back sheet, or as one or more markings or notches extending across or aligned on opposing sides of a portion of the label assembly.

The invention further includes a method for labeling an object with a label from a label assembly. The method includes: providing a label assembly including a face sheet with a label shape defined by at least one tearable line of separation, a back sheet adjacent to the face sheet, an adhesive material disposed between the face sheet and the back sheet, a first removable panel formed in the back sheet and disposed over a first portion of the label shape, and a second removable panel formed in the back sheet, separated from the first removable panel by a tearable panel separation line, and disposed over a second portion of the label shape; removing at least a portion of the first removable panel to expose the adhesive material on a first portion of the label shape; aligning the label assembly to the object; adhering the first portion of the label shape to the object; grasping a middle portion of an edge of the second removable panel along the panel separation line; removing the second removable panel to expose the adhesive material on a second portion of the label shape by pulling the second removable panel from the grasped middle toward an opposing side edge of the label assembly; and applying the second portion of the label shape to the object.

Other features and advantages will be apparent to those skilled in the art from the following detailed description taken in conjunction with the appended claims and drawings.

DETAILED DESCRIPTION OF EMBODIMENTS OF THE INVENTION

The present invention is directed to a label assembly including a self-adhesive label that can be applied to an object without the need for a separate application device. The object can be any object, but is particularly useful for applying a label (commonly referred to as a skin) to electronic devices such as, without limitation, portable music players, computers, and cell/smart phones. Embodiments of this invention are particularly suited for use with larger handheld electronic devices such as, without limitation book readers, tablet computers, and laptop computers.

The label assembly of this invention includes a face sheet with at least one label shape defined by at least one tearable line of separation, a back sheet adjacent to the face sheet, and an adhesive material disposed between the face sheet and the back sheet. The back sheet includes one or more removable panels so that all or less than all of the adhesive material on the label can be exposed during adherence of the label. Where there is more than one, the back sheet panels are divided from each other by a panel separation line that also defines a grasp tab for use in removing the panels from the adhesive label, either before or after a portion of the label has been applied to the object.

Figure 1:
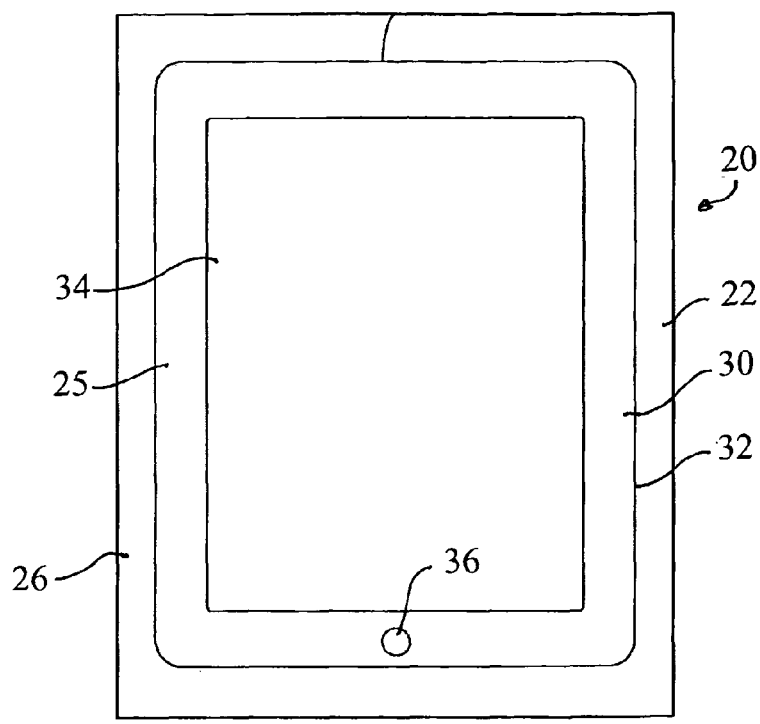
FIG. 1 is a plan view of a label assembly according to one embodiment of this invention.
Figure 2:
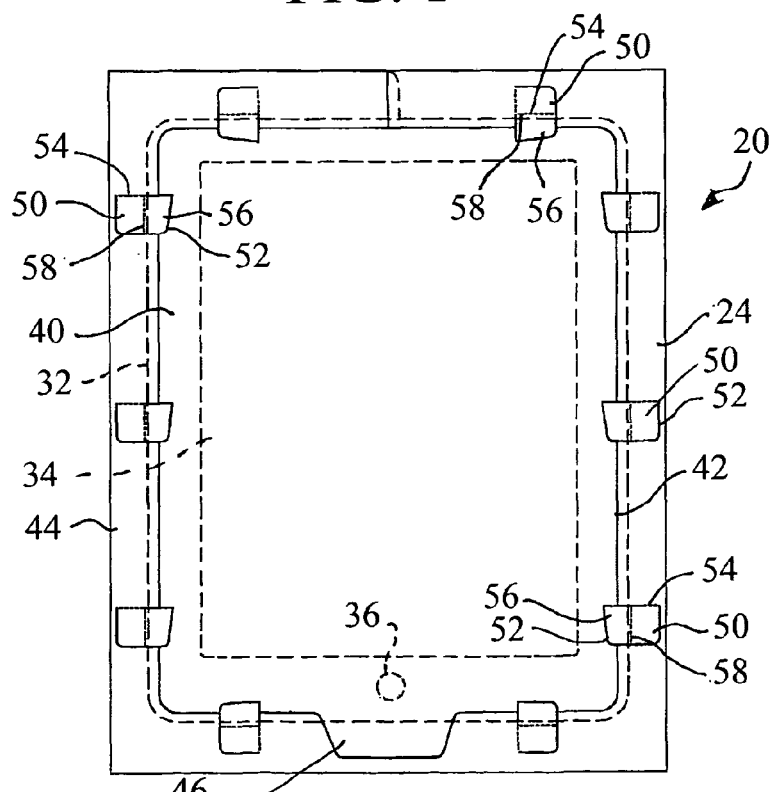
FIG. 2 is a plan view of the label assembly of FIG. 1, viewed from an opposite side.

FIGS. 1 and 2 show a label sheet 20 (not necessarily shown to scale) according to one embodiment of this invention. Label sheet 20 is desirably formed of a face sheet 22 and a back sheet 24. The back sheet 24 is desirably about the same size as the face sheet 22, but may be slightly larger or smaller than the face sheet 22. The surface of the face sheet 22 that is disposed toward the back sheet 24 includes an adhesive material coating. The adhesive coating can include any adhesive material known and available to those skilled in the art for forming pressure sensitive, or self-adhesive, labels. The back sheet 24 is desirably formed of a material to which the adhesive coating adheres significantly less than to the face sheet 22, such as is known for forming pressure sensitive, or self-adhesive, labels.

The sheet 20 is of any suitable shape, and generally any suitable size that can be accepted by and fed through a printer, such as a laser printer or an ink jet printer. Common sizes of paper generally fed through printers are 8.5 inches by 5.5 inches, 8.5 inches by 11 inches, 8.263 inches by 11.688 inches (A4 size), and 8.5 inches by 14 inches, however the size can be smaller or larger, depending on need and the object to be labeled. The face sheet is preferably, but not necessarily, constructed of any suitable paper, paper composite, polymer material, non-metal and/or metal material that can be used as a label. Other suitable materials for constructing the sheet include fabric, plastic, and metal foils. The adhesive coating covered by the back sheet is applied to the face sheet in any suitable manner known to those skilled in the art. The face sheet desirably has a printable surface on a side opposite the adhesive coating.

The face sheet and the printable surface can be any of a variety of face materials used to make pressure sensitive or self-adhesive labels. Such face materials may include, but are not limited to: smudgeproof stock, litho stock, cast coated stock, tag stock, fluorescent stock, foils, computer printable polyester, vinyl, satin cloth, Tyvek™ material, flexible plastic, book papers, photo quality papers and/or photo quality film. Furthermore, various portions of the face materials can be different colors, thereby resulting in different colored parts.

The phrase "printable surface" relates to a surface of any type of matter upon which a person or machine can draw, print, color, paint, photocopy, write, emboss, or make any other type of mark or graphic. Laser printers, ink jet printers, impact printers, thermal transfer printers, direct thermal printers, typewriters, or any other suitable graphic printing devices are preferred but not necessary for use with printable surfaces according to this invention. The face sheet can also be pre-printed by the manufacturer or retailer with graphics and/or test desirable to a consumer user. The printed surface can include any desirably image or text, or can be colored or include holographic images.

The face sheet 22 includes a label shape 30, defining in the face sheet 22 an individual label according to this invention. The phrase "shape", or the phrase "removable or tearable shape", is intended to relate to a shape, such as, but not limited to, the generally rectangular shape shown in FIG. 1 by element reference numeral 30, that can be torn away from a remaining portion 26 of the face sheet 22, by using tearable lines of separation 32. The term "tearable lines of separation," also referred to as simply "tearable lines," "lines of separation" or "separation lines," relate to physical or structural lines that can be torn to separate a removable portion or section from the remaining portion or section of the label and/or the label assembly according to this invention. The label portion of this invention may further include additional separation lines and/or lines of weakness and/or fold lines to aid in positioning and/or adhering the label around an object. Lines of separation and/or lines of weakness according to this invention can be formed of a die-cut line, a laser die-cut line, a score cut line, a perforation line (such as having a plurality of cuts and ties), a microperforation line, a chemically etched line, a liquid etched line, a gas etched line, or any combination of these types of separation, or any other suitable structure that enables separation. A preferred type of tearable line is a line that is die-cut. The label shape can be die-cut along at least a portion of a periphery, such that the label shapes can be easily removed or separated from the remaining portion of the assembly sheet, for example after the sheet is run through a printer.

The label shape 30 shown in FIG. 1, for illustration purposes, is for the front (screen-side) surface of an IPAD® tablet device, available from Apple, Inc. The label shape 30 has the desired size, shape, and configuration to label the front side of the IPAD® device. The label shape includes removable shapes 34 and 36 cut within the label periphery formed by line of separation 32. The removable shape 34 corresponds to the device screen and the removable shape 36 corresponds to a control button on the device. As will be appreciated, various number, sizes, shapes, placements, and configurations of such removable shapes can be included, depending on the object to be labeled, to coordinate with features, such as screens, control devices, microphones or other functional features, or decorative features such as corporate or device logos or names. In the embodiment of FIG. 1, the removable shapes 34 or 36 are optional or optionally removable by the user. In another embodiment of the invention the area of shape 34 can be formed of, or include beneath the removable shape 34, a clear material, such as using a clear or double layer face sheet 22, thereby providing a screen protector as well as a decorative feature.

The back sheet 24 includes a removable panel 40, shown in FIG. 2. The removable panel 40 is defined by a tearable line of separation 42 extending around the periphery of the removable panel 40 in a surface of the back sheet 24. The removable panel 40 is desirably and optionally sized slightly smaller than the label shape 30. A remaining portion 44 of the back sheet 24 is disposed around, and desirably surrounding, the removable panel 40. The removable panel 40 includes a grasp tab 46 extending from a midpoint of an end of the panel 40 into the remaining portion 44. The grasp tab 46 provides a user an efficient mechanism for holding and pulling during removal of the panel 40.

The label sheet 20 includes an optional registration structure for aligning the label assembly with the object. The registration structure desirably assists in obtaining consistent and aligned placement of the label on the object. FIG. 2 illustrates one embodiment of a registration structure according to this invention, embodied as a plurality of spaced apart registration tabs 50 aligned with the label shape 30 and the removable panel 40. As will be described in more detail below, the registration structure of this invention allows for improved and easier application of a label to an object. As shown in the embodiment of FIG. 2, each of the tabs 50 is defined on at least three sides by a tearable line of separation 52 in the back sheet 24. The tabs 50 are desirably disposed on more than one side of the label shape 30 and/or removable panel 40, and preferably positioned around all sides as shown in FIG. 2.

The tabs 50 are each connected to the remaining portion 44 by a fold line 54. Each tab 50 is raisable to an extended position by folding at the fold line 54 outward above the back sheet. Each tab shown in FIG. 2 also includes an optional foldable portion 56 foldable about a tab fold line 58 that extends at least substantially perpendicular to fold line 54. The tab fold line 58, which can be imaginary or a perforated or otherwise scored fold line, is slightly spaced from the tearable line 32, so that the foldable portion 56, when the tab 50 is raised folded about tab fold line 58, is aligned with an edge of the label shape 30.

Various and alternative sizes, shapes, amounts, and configurations are available for the registration tabs according to this invention and the object to be labeled. Exemplary registration structures are disclosed in commonly owned U.S. Pat. No. 7,726,696, and U.S. Patent Publications 2009/0295140; 2009/0295143, and 2008/0093839.

Figure 3:
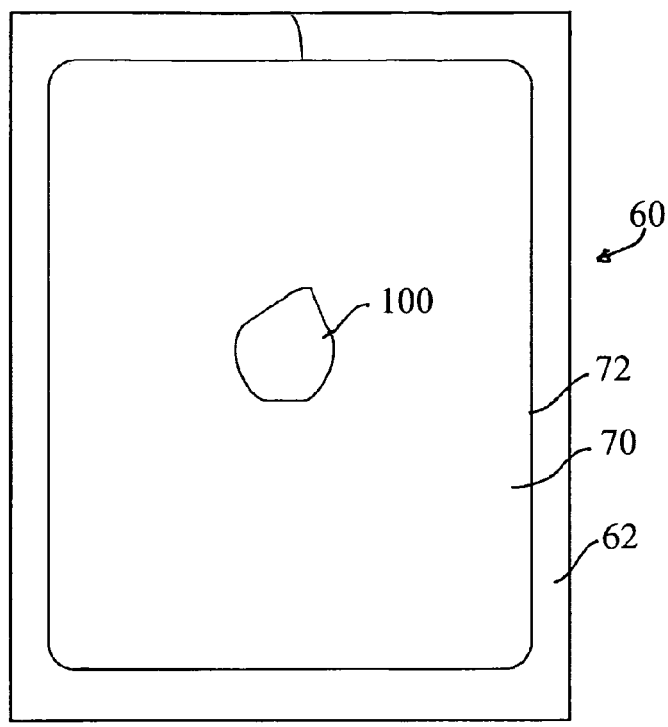
FIG. 3 is a plan view of a label assembly according to another embodiment of this invention.
Figure 4:
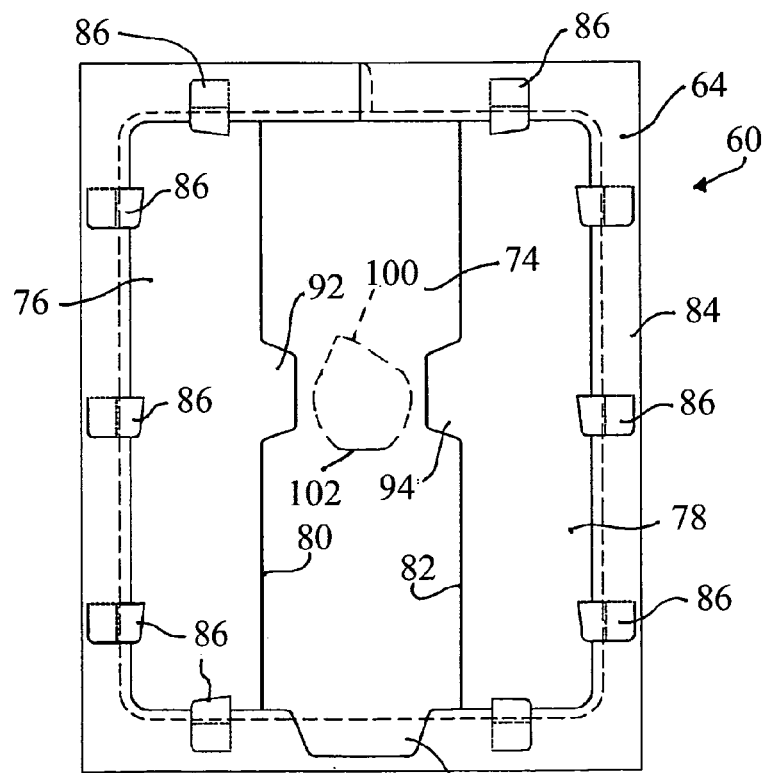
FIG. 4 is a plan view of the label assembly of FIG. 3, viewed from an opposite side.

FIGS. 1 and 2 illustrate a label assembly for labeling a screen side of an electronic device. FIGS. 3 and 4 illustrate a label assembly 60 for optional or alternative labeling of an opposite back side of the electronic device.

The label assembly 60 of FIGS. 3 and 4 includes a face sheet 62, a back sheet 64 adjacent to the face sheet 62, an adhesive material disposed between the face sheet 62 and the back sheet 64, and a label shape 70 defined by at least one tearable line of separation 72 in the face sheet 62.

The back sheet 64 shown in FIG. 4 includes a first removable panel 74 disposed over at least a first portion of the label shape 70. The first removable panel 74 shown in FIG. 2 forms a center panel between a second removable panel 76 disposed over a second portion of the label shape 70 and a third removable panel 78 disposed over a third portion of the label shape 70. The second removable panel 76 is adjacent to and separated from the first removable panel 76 by a first panel separation line 80. The third removable panel 78 is adjacent to and separated from the first removable panel by a second panel separation line 82. A remaining portion 84 of the back sheet surrounds the removable panels 74-78. Registrations tabs 86, such as discussed above, extend from the remaining portion 84 and are raisable above the back sheet 64.

Each of the removable panels 74-76 includes a grasp tab for use in removing the corresponding removable panel. The first removable panel 74 includes a first grasp tab 90 extending from a midpoint of an end of the panel 74 into the remaining portion 84. The first grasp tab 90 provides a user an efficient mechanism for holding and pulling during removal of the first removable panel 74. A second grasp tab 92 is defined by the first panel separation line 80 and extends from a midpoint of the second removable panel 76 toward or into the first removable panel 74. A third grasp tab 94 is defined by the second panel separation line 82 and extends from a midpoint of the third removable panel 76 toward or into the first removable panel 74. The opposing second and third grasp tabs 92, 94 also provide for easier removal of the respective removable panel. The placement of the grasp tabs at or around the midpoint of the panel sides allows the second and third panels 76, 78 to be laterally pulled from the label middle outward to be removed, which can promote easier, air bubble free application of the label shape to the object. As will be appreciated, various number, sizes, shapes, placements, and configurations are available for the removable panels and grasp tabs of this invention, depending on need and the object to be labeled.

The label shape 70 includes a removable shape 100 cut in the face sheet 62 within the label periphery formed by line of separation 72. The removable shape 100 shown in FIG. 4 has a shape that corresponds to a device logo on the back side of the device. A die cut 102 in the back sheet 64 extends along a portion of the perimeter of the removable shape 100. The die cut 102 is disposed on a side of the removable shape 100 that faces toward the grasp tab 90. According to one preferred embodiment of this invention, when the first removable panel 74 is peeled away or otherwise removed from label shape 210 by pulling grasp tab 90 toward and past the removable shape 100, the removable shape 100 remains adhered to the panel 74, thereby opening a hole in the label shape corresponding to the device logo.

Figure 5:
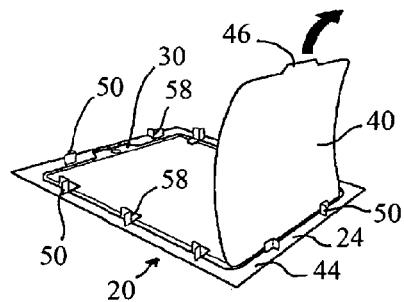
FIGS. 5-7 illustrate the use of the label assembly of FIGS. 1 and 2.
Figure 6:
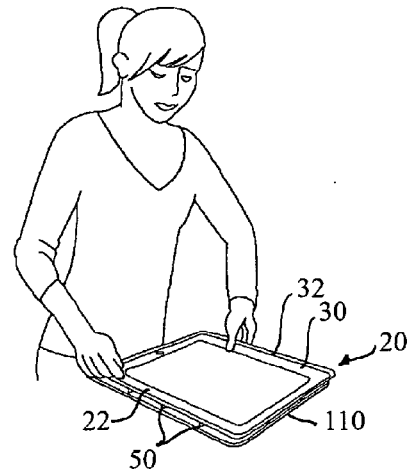
Figure 7:
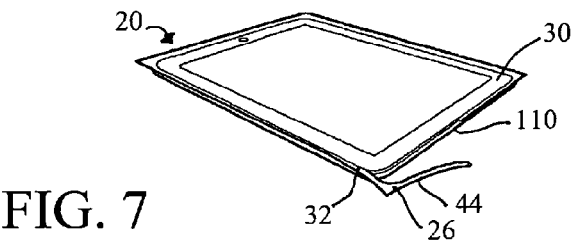
Figure 8:
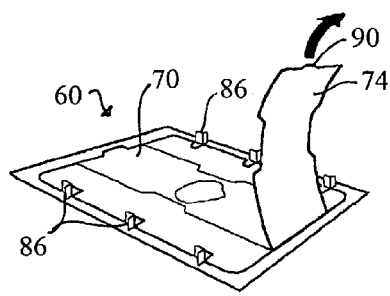
FIGS. 8-9 illustrate the use of the label assembly of FIGS. 3 and 4.
Figure 9:
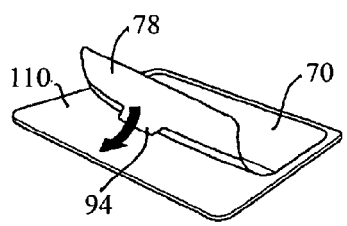

FIGS. 5-7 illustrate the use of the label assembly 20 to label a front side of a device 110. FIGS. 8 and 9 illustrate the use of label assembly 60 to label the opposing back side of the device 110. One or each of the label shapes 30 or 70 can be printed upon before the assembly steps as shown in FIGS. 5-9, such as by routing the label assemblies 20, 60 through a laser or inkjet printer. Image or information can be printed on at least a portion of label shapes 30 and/or 60. As used herein, the terms "image" or "information" refer to any suitable or desirable print, photograph, electronic image, such as a digital photograph, a picture, a color, a display drawing, a letter, a text, a number, a word and/or a symbol, and/or any other desirable image or information. For example, the label of this invention adhered to an object may include one or more decorative designs selected by the user and/or selected personal information.

In FIG. 5, the removable panel 40 is removed and the registration tabs 50 are raised and folded along tab fold line 58. In this embodiment shown in FIG. 5, the removable shape 34 is removed by remaining adhered to the removable panel 40. The device 110 is placed front side upward on a flat surface, such as a table. The label assembly 20, with the exposed adhesive material, is placed over the device 110 in FIG. 6. The registration tabs 50 act as legs to hold the label assembly 20 just above the device 110 and in an aligned position. The user presses the exposed adhesive material on the label shape 30 into contact with the device to adhere the label shape 30 to the device, while the tabs 50 maintain the aligned position of the label shape 30 to the device 110. In FIG. 7, the remaining portion 44 is removed from the label shape to provide a labeled device 110.

A similar method is used with label assembly 60 in the embodiment shown in FIGS. 8 and 9. The center panel 74 is removed with removable shape 100 adhered thereto using grasp tab 90. The device 110 is placed front side down on the surface and label assembly 60, with tabs 86 raised and folded, is aligned over the device 110. The exposed adhesive material under the first removable panel 74 is adhered to the device 110 and then the second and third removable panels 76, 78 are removed by pulling the respective grasp tab 92, 94 as shown in FIG. 9. Adhering the label shape 70 as the side panels 76, 78 are being removed facilitate alignment of the further label portion, and/or can reduce or eliminate air bubbles between the adhered label 70 and the device 110.

The removable panel(s) and the registration structures of this invention allow for relatively easier and better placement of a label onto an object, without the need for a separate applicator device. As will be appreciated by those skilled in the art following the teachings herein provided, various and alternative sizes, shapes, and configurations are available for the labels, removable panels, and registration structures according to this invention.

Figure 10:
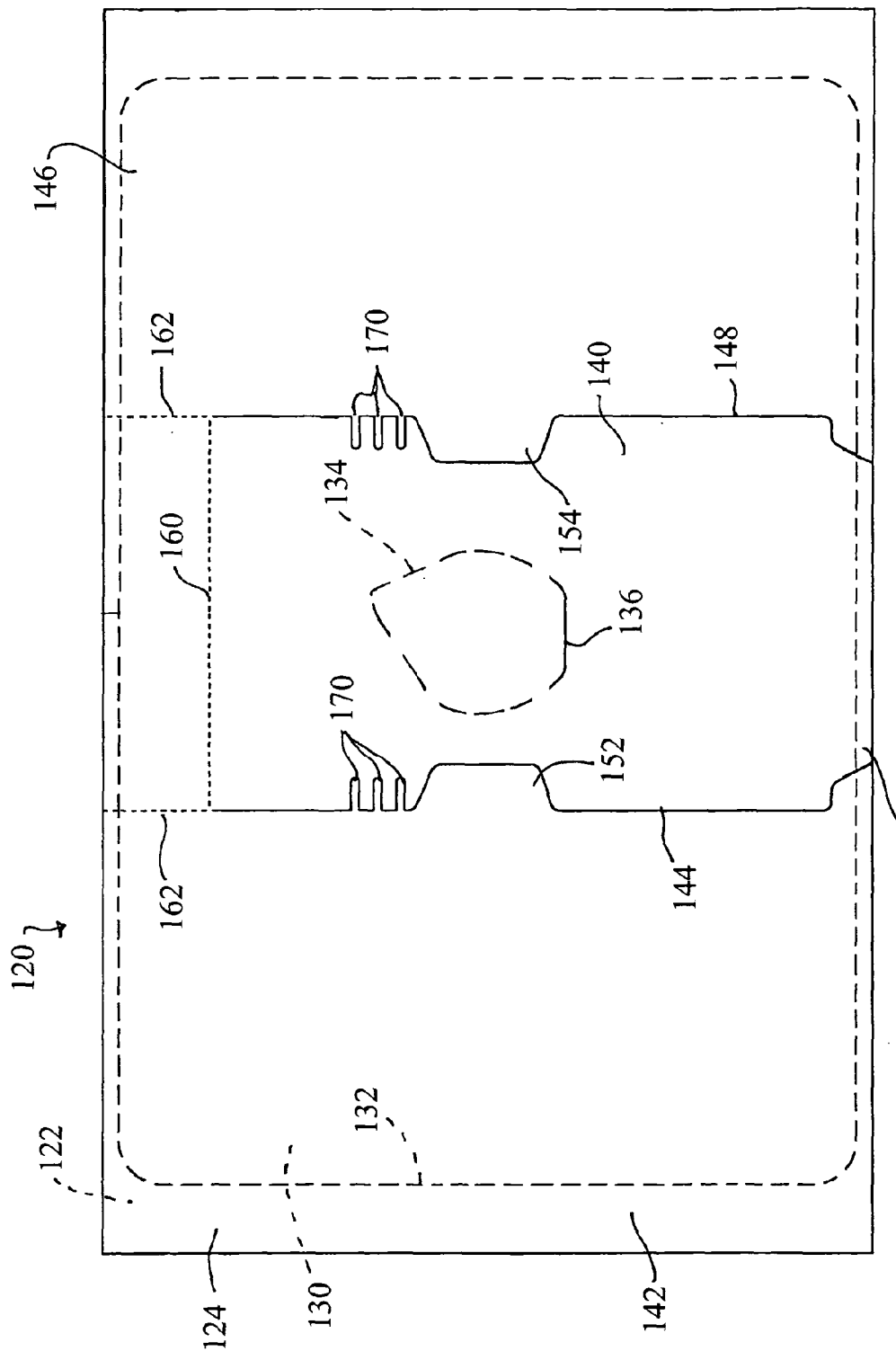
FIG. 10 is a plan view of a label assembly according to yet another embodiment of this invention.

FIG. 10 illustrates a label assembly 120 according to anther embodiment of this invention. Label assembly 120 is desirably formed of a face sheet 122 and a back sheet 124. The back sheet 124 is desirably about the same size as the face sheet 122, but may be slightly larger or smaller than the face sheet 22. The surface of the face sheet 122 that is disposed toward the back sheet 124 includes an adhesive material coating.

The face sheet 122 includes a label shape 130 that can be torn away from a remaining portion of the face sheet 122, by using tearable lines of separation 132. The label shape 130 shown in FIG. 1, for illustration purposes, is for a top surface of a laptop computer. The label shape 130 includes a removable shape 134 within the label periphery formed by line of separation 132. The removable shape 134 corresponds to the logo on the top surface of the laptop. A die cut 136 in the back sheet 124 and extending along a portion of the removable shape 134 periphery causes the removable shape 134 to automatically remove when a first removable panel 140 is removed by the user.

The first removable panel 140 is separated from a second removable panel 142 by a first panel separation line 144, and separated from a third removable panel 146 by a second panel separation line 148. The first removable panel 140 includes a first grasp tab 150 that is defined on opposing sides by the first and second panel separation lines 144, 148, and that extends from the first removable panel 140 into contact with an edge of the label assembly 120. The second removable panel 142 includes a second grasp tab 152 defined by the first panel separation line 144 and extending from the second removable panel 142 toward or into the first removable panel 140. The third removable panel 146 includes a third grasp tab 154 defined by the second panel separation line 148 and extending from the third removable panel 146 toward or into an opposing side of the first removable panel 140.

Figure 11:
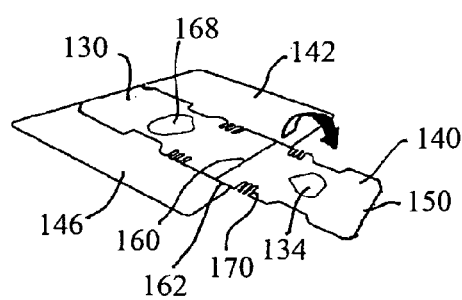
FIGS. 11-14 illustrate the use of the label assembly of FIG. 10.
Figure 13:
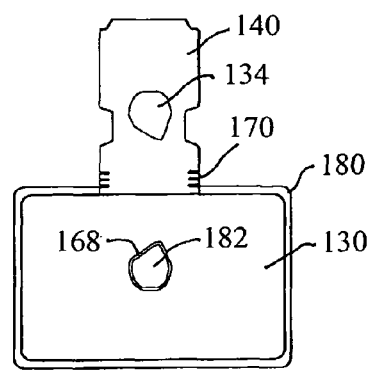

In the embodiment shown in FIG. 10, the center first removable panel 140 includes a fold line 160 extending across the first removable panel 140. The fold line 160 is preferably formed of a perforated line, but can be formed of any suitable structure that promotes folding at the fold line 160. During use the first removable panel is pulled from the grasp tab 150 off the adhesive material back to the fold line 160. The first removable panel 140 is folded back upon itself about the fold line 160 during application of a portion of the label shape 130 to the object, as shown in FIG. 11. A portion of the first and second panel separation lines 144, 148 extending between the fold line 160 and an edge of the label assembly are desirably formed of a perforated or otherwise scored line 162. The perforated portions 162 of the panel separation lines 144, 148 serve to limit the initial separation of the first removable panel 140 until after the label is applied as shown in FIG. 13, and then the user can further remove the first removable panel 140 by ripping or otherwise breaking along the perforations of line 162.

The label assembly 120 also includes a registration structure for aligning the label assembly with the object. In one embodiment of this invention, the registration structure includes a registration indicator that extends across or is otherwise aligned on opposing edges of the first removable panel 140. The registration indicator can be a marking extending across the first removable panel 140 or a pair of aligned markings on opposing side edges of the first removable panel 140.

In one embodiment of this invention, the registration indicator includes several markings adapting the label assembly for use in centering a label shape on any of several objects having different dimensions.

In one embodiment of this invention, as shown in FIG. 10, the registration indicator is formed of at least two registration notches 170 disposed and aligned on opposing sides of the first removable panel 140. More particularly, the registration indicator of FIG. 10 is formed of three pairs of registration notches 170, with each pair including two notches 170 spaced apart on opposing sides of the panel 140. Each opposing pair of notches 170 corresponds to a different model and size of the laptop computer. Using the appropriate pair of notches aligns the label shape with the computer to be labeled, and more particularly aligns the opening formed by removable shape 134 with the corresponding logo feature of the laptop.

As will be appreciated, various sizes, shapes, and configurations are available for the registration indicator of this invention. For example, a one or more slit-like openings extending across the middle of the panel 140 and parallel to the fold line 160 can be included as a registration indicator. Such slits are suitable for use with an object not requiring a central removable shape such as shape 134, which lies between the notches 170.

Figure 12:
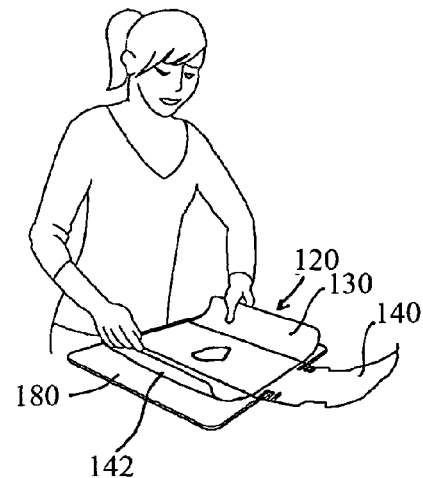

FIGS. 11-14 illustrate the labeling of a device 180, such as a laptop computer, with the label assembly of FIG. 10. As discussed above, FIG. 11 illustrates the removing of a portion of the first removable panel 140 to expose the adhesive material on a first portion of the label shape 130. The first removable panel is folded at fold line 160. In FIG. 12, the label assembly 120 is aligned with and adhered to the device 180 by aligning the first pair of notches 170 with an edge of the device 180. The label assembly 120 is desirably aligned using both the registration indicator and the opening 168 for the decorative logo feature 182 on the device 180.

Figure 14:
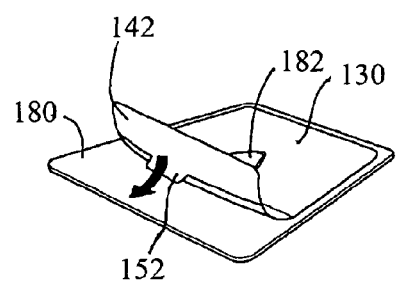

FIG. 13 illustrates the first portion of the label shape 130 adhered to the device 180. FIG. 13 illustrates the first pair of notches 170 aligned with, and placed against, the edge of the device 180. Once adhered, the first removable panel 140 can be fully removed by pulling the panel 140 and separating perforated lines 162. FIG. 14 illustrates the removal of the second removable panel 152 by pulling the grasp tab 152, which is at a middle portion of an edge of the second removable panel along the panel separation line, back toward the opposing edge of the panel 142 and label assembly 120. Desirably, a second portion of the label shape 130 is applied to the object 180 during the step illustrated in FIG. 14. Repeating the step shown in FIG. 14 for both side removable panels completes the adhering of the label shape 130 to the object 180.

Thus the invention provides a label assembly that provides an aligned and air-bubble free application of a label to an object. Use of a registration structure promotes the desired straightened and/or central alignment of the label to the object, while central grasp tabs for removing back sheet panel portions allows for a taught application that reduces or eliminates air bubbles. The label assembly of this invention allows for application of a label to an object without the need for a separate label application apparatus, while still providing the desired placement on the object, such as centered placement of a label on an object such as a portable electronic device.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A label assembly including a label for an object, comprising:
   a face sheet with at least one label shape defined by at least one tearable line of separation;
   a back sheet adjacent to the face sheet;
   an adhesive material disposed between the face sheet and the back sheet;
   the back sheet including a first removable panel disposed over a first portion of the label shape and a second removable panel disposed over a second portion of the label shape, the second removable panel adjacent to and separated from the first removable panel by a panel separation line;

a first grasp tab extending from the first removable panel into contact with a remaining portion of the back sheet or an edge of the label assembly; and a second grasp tab defined by the panel separation line and extending from the second removable panel toward the first removable panel.

2. The label assembly according to claim 1, further comprising:

a removable shape cut in the face sheet within an outer perimeter of the label shape; and a die cut in the back sheet extending partially along a perimeter of the removable shape and disposed on a side of the removable shape toward the grasp tab.

3. A label assembly including a label for an object, comprising:

a face sheet with at least one label shape defined by at least one tearable line of separation;

a back sheet adjacent to the face sheet;

an adhesive material disposed between the face sheet and the back Sheet;

the back sheet including a first removable panel defined between two panel separation lines and disposed over a first portion of the label shape and a grasp tab extending from the first removable panel into contact with a remaining portion of the back sheet or an edge of the label assembly; and a fold line extending across the first removable panel and between the two panel separation lines, wherein the removable panel is folded at the fold line during application of a portion of the label shape to the object.

4. The label assembly according to claim 3, wherein a portion of the panel separation line between the fold line and an edge of the label assembly comprises perforations.

5. The label assembly according to claim 1, wherein the first removable panel is a center panel between the second removable panel and a third removable panel, and further comprising a second panel separation line separating the third removable panel from the first removable panel.

6. The label assembly according to claim 5, wherein the grasp tab is at an end of the first removable panel extending between the second and third removable panels, and is defined on a first side by the panel separation line and defined on a second side by the second panel separation line.

7. The label assembly according to claim 1, further comprising a registration structure for aligning the label assembly with the object.

8. The label assembly according to claim 7, wherein the registration structure comprises a registration tab cut into the back sheet, wherein the registration tab is raisable by folding outward above the back sheet.

9. The label assembly according to claim 8, further comprising a plurality of registration tabs extending around an outer periphery of the label shape.

10. The label assembly according to claim 8, wherein the back sheet comprises a remaining portion disposed around the removable panel and more than one retainer tab extending from the remaining portion.

11. The label assembly according to claim 7, wherein the back sheet comprises a remaining portion disposed around the removable panel and wherein the registration structure comprises a plurality of registration tabs positioned external of an outer periphery of the removable panels and each defined by a tearable line of separation in the back sheet, wherein the registration tabs are raisable by folding outward above the back sheet and each include a tab fold line substantially perpendicular to a fold line connecting the registration tab to the back sheet, wherein an edge of the foldable portion is aligned with a portion of the label shape when raised and folded.

12. The label assembly according to claim 7, wherein the registration structure comprises a registration indicator extending across or aligned on opposing edges of the first removable panel.

13. The label assembly according to claim 12, wherein the registration indicator comprises two registration notches disposed and aligned on opposing sides of the first removable panel.

14. The label assembly according to claim 12, further comprising:

a fold line extending across the first removable panel, wherein the first removable panel is folded at the fold line during application of a portion of the label shape to the object; and a portion of the panel separation line between the fold line and an edge of the label assembly formed of perforations.

15. The label assembly according to claim 14, wherein the registration structure comprises a plurality of spaced apart pairs of registration notches each comprising two registration notches disposed and aligned on opposing sides of the first removable panel.

16. A method for labeling an object with a label from a label assembly, the method comprising:

providing a label assembly including a face sheet with a label shape defined by at least one tearable line of separation, a back sheet adjacent to the face sheet, an adhesive material disposed between the face sheet and the back sheet, a first removable panel formed in the back sheet and disposed over a first portion of the label shape, and a second removable panel formed in the back sheet, separated from the first removable panel by a tearable panel separation line, and disposed over a second portion of the label shape;

removing at least a portion of the first removable panel to expose the adhesive material on a first portion of the label shape;

aligning the label assembly to the object;

adhering the first portion of the label shape to the object;

grasping a middle portion of an edge of the second removable panel along the panel separation line;

removing the second removable panel to expose the adhesive material on a second portion of the label shape by pulling the second removable panel from the grasped middle toward an opposing side edge of the label assembly; and applying the second portion of the label shape to the object.

17. The method according to claim 16, wherein aligning the label assembly to the object comprises placing a registration structure of the label assembly against the object.

18. The method of claim 16, wherein the label shape includes a removable shape cut in the face sheet within an outer perimeter of the label shape, the removable shape corresponding to a feature of the object and further comprising removing the removable shape by removing the first removable panel and aligning an opening corresponding to the removable shape with the feature of the object.

19. The method according to claim 18, wherein the label assembly comprises a die cut in the back sheet extending partially along a perimeter of the removable shape and disposed on a side of the removable shape toward a grasp tab at the end of the first removable panel, and further comprising removing the removable shape when the first removable panel is pulled from the grasp tab toward the die cut.

* * * * *